US011345115B2

(12) United States Patent
Cara

(10) Patent No.: US 11,345,115 B2
(45) Date of Patent: May 31, 2022

(54) MULTILAYERED TAPE WITH REMOVABLE CARRIER LAYER

(71) Applicant: Justin Cara, Brooklyn, NY (US)

(72) Inventor: Justin Cara, Brooklyn, NY (US)

(*) Notice: Subject to any disclaimer, the term of this patent is extended or adjusted under 35 U.S.C. 154(b) by 54 days.

(21) Appl. No.: 16/834,188

(22) Filed: Mar. 30, 2020

(65) Prior Publication Data

US 2021/0299993 A1  Sep. 30, 2021

(51) Int. Cl.
| | |
|---|---|
| *B32B 3/16* | (2006.01) |
| *B32B 3/18* | (2006.01) |
| *B32B 7/06* | (2019.01) |
| *C09J 7/20* | (2018.01) |
| *B32B 7/14* | (2006.01) |
| *C09J 7/29* | (2018.01) |

(52) U.S. Cl.
CPC .............. *B32B 3/16* (2013.01); *B32B 3/18* (2013.01); *B32B 7/06* (2013.01); *B32B 7/14* (2013.01); *C09J 7/203* (2018.01); *C09J 7/29* (2018.01); *B32B 2405/00* (2013.01); *C09J 2203/31* (2013.01); *C09J 2301/12* (2020.08); *C09J 2301/16* (2020.08); *C09J 2301/502* (2020.08); *Y10T 428/14* (2015.01)

(58) Field of Classification Search
CPC .... B32B 3/16; B32B 3/18; B32B 7/06; B32B 7/14; B32B 2405/00; C09J 7/203; C09J 7/29; C09J 2203/31; C09J 2301/12; C09J 2301/16; C09J 2301/502; Y10T 428/14
See application file for complete search history.

(56) References Cited

U.S. PATENT DOCUMENTS

| | | | | |
|---|---|---|---|---|
| 2,657,795 A | * | 11/1953 | Calabrese | B29C 65/76 |
| | | | | 242/160.1 |
| 3,368,669 A | * | 2/1968 | Ernesto | C09J 7/21 |
| | | | | 242/160.4 |
| 5,658,632 A | | 8/1997 | Krabill | |
| 7,799,381 B2 | | 9/2010 | Lian et al. | |
| 2018/0043391 A1 | * | 2/2018 | Jules | B05B 12/24 |
| 2020/0130980 A1 | * | 4/2020 | Wold | E04F 21/1655 |

\* cited by examiner

*Primary Examiner* — Patricia L. Nordmeyer
(74) *Attorney, Agent, or Firm* — Dunlap Bennett & Ludwig, PLLC; Anna L. Kinney

(57) ABSTRACT

A multilayer tape is provided. A method of masking a surface is also provided. The multilayer tape includes an inner layer, at least one middle layer, and an outer carrier layer. The inner layer has a pair of parallel adhesive strips demarking an inner gap having a predetermined width. The middle layer is adhered to the inner layer and has a pair of parallel adhesive strips demarking a middle gap narrower than the inner gap. The outer carrier layer is adhered to the middle layer. The method includes applying a multilayer tape system to a surface and removing the outer carrier layer to expose a preselected gap width. The multilayer tape system includes an inner layer, at least one middle layer, and an outer carrier layer.

10 Claims, 3 Drawing Sheets

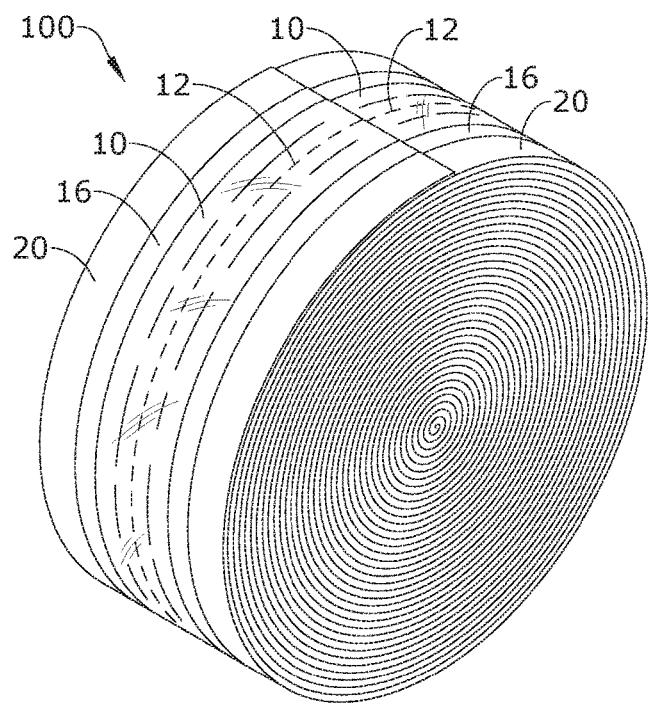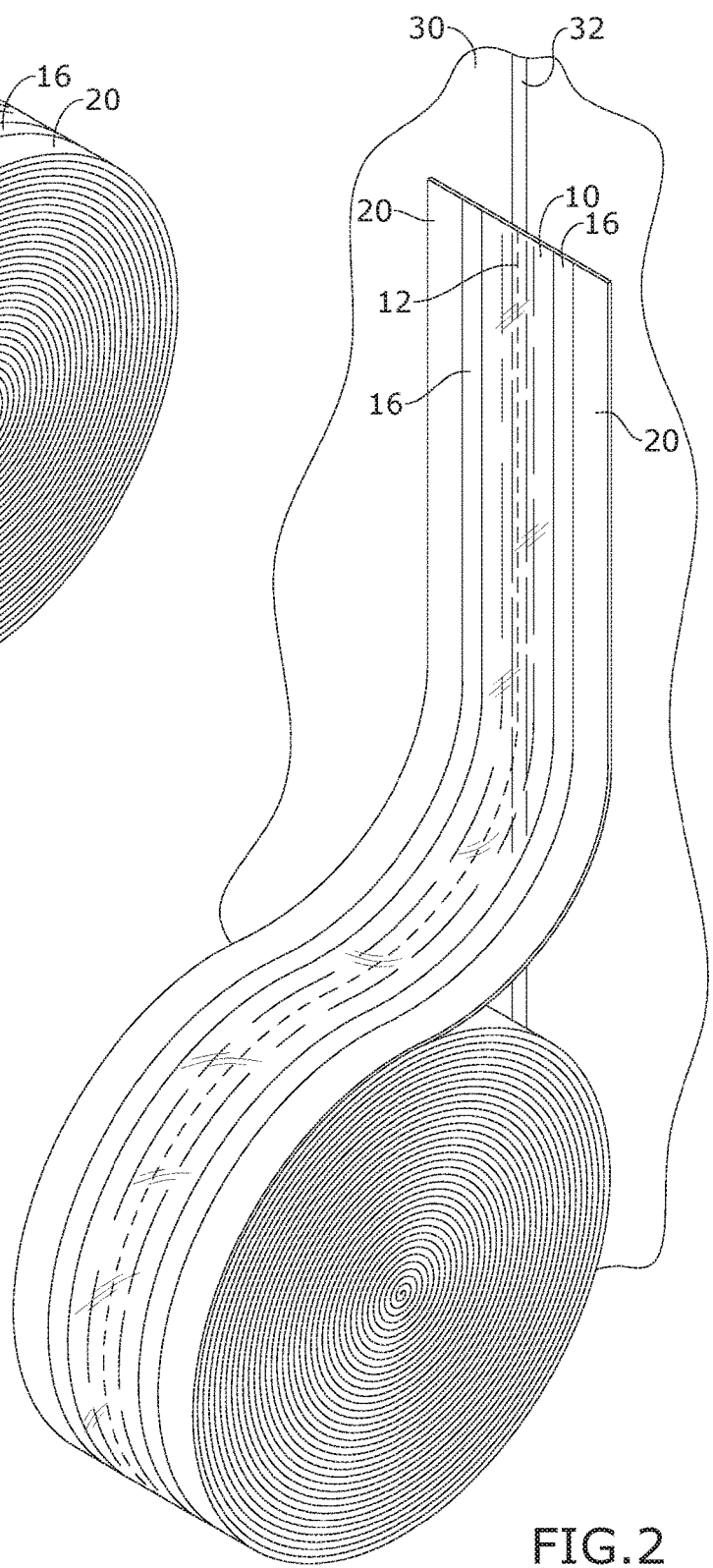
FIG.1
FIG.2

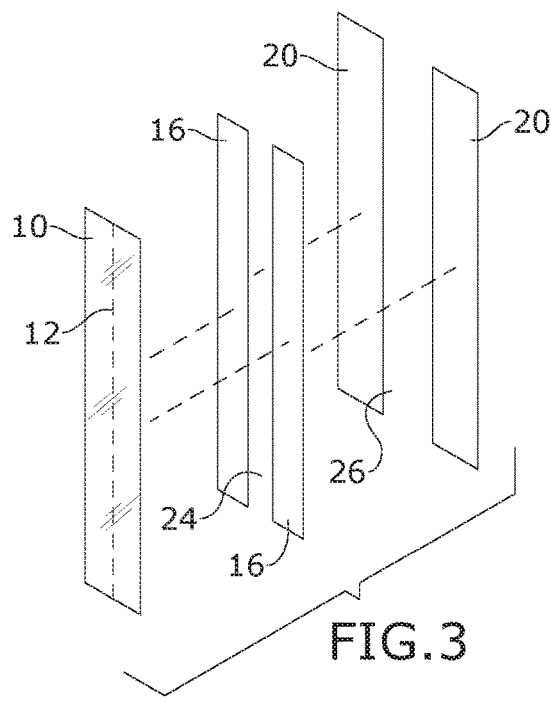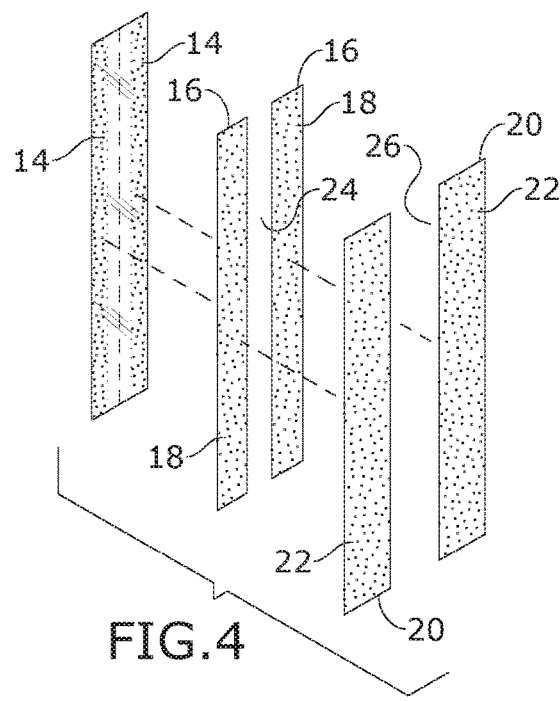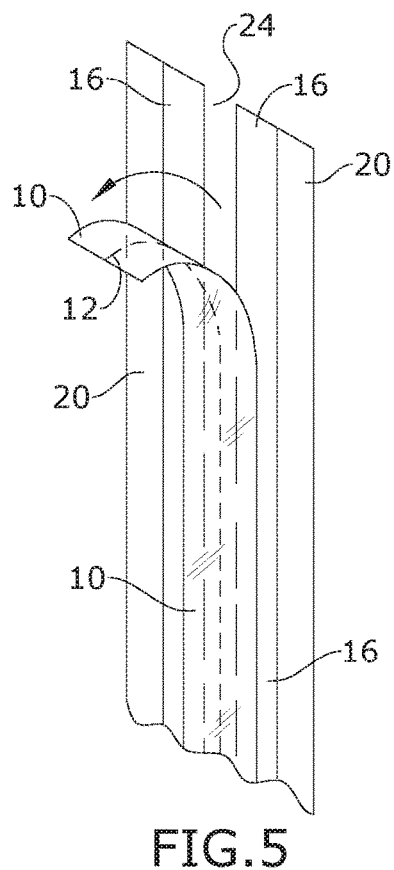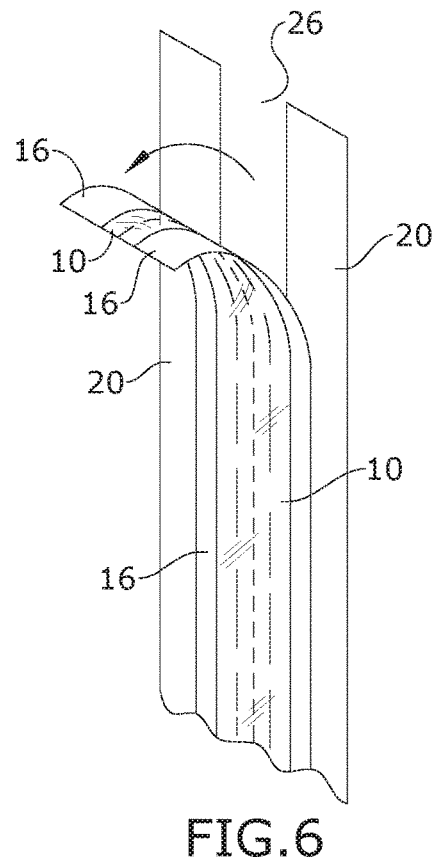

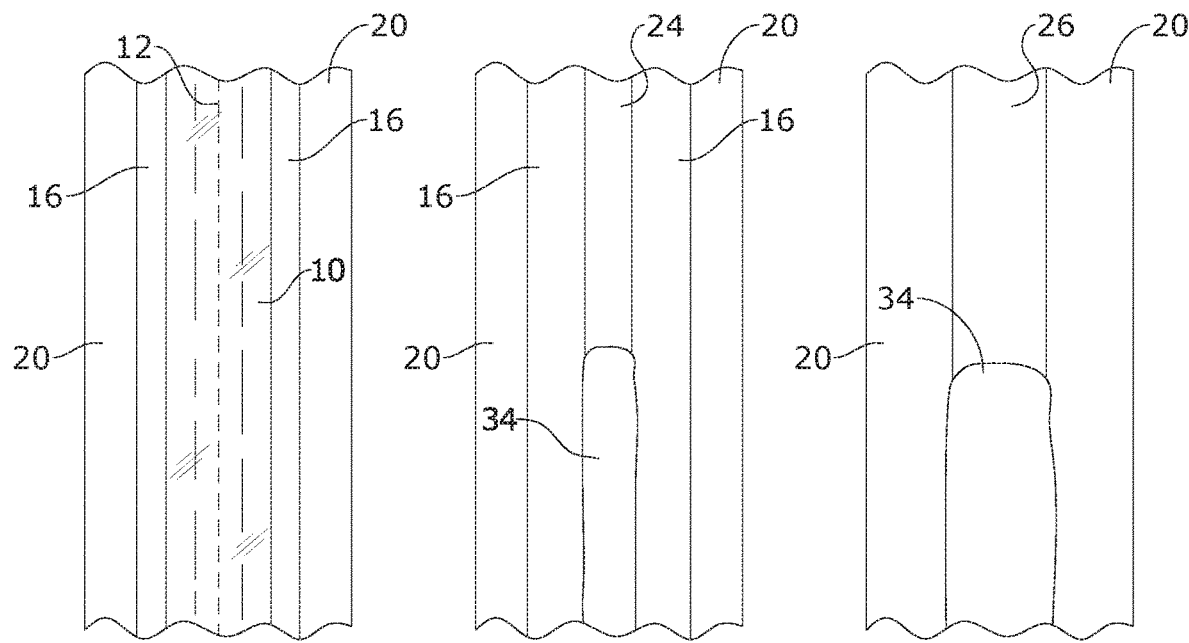
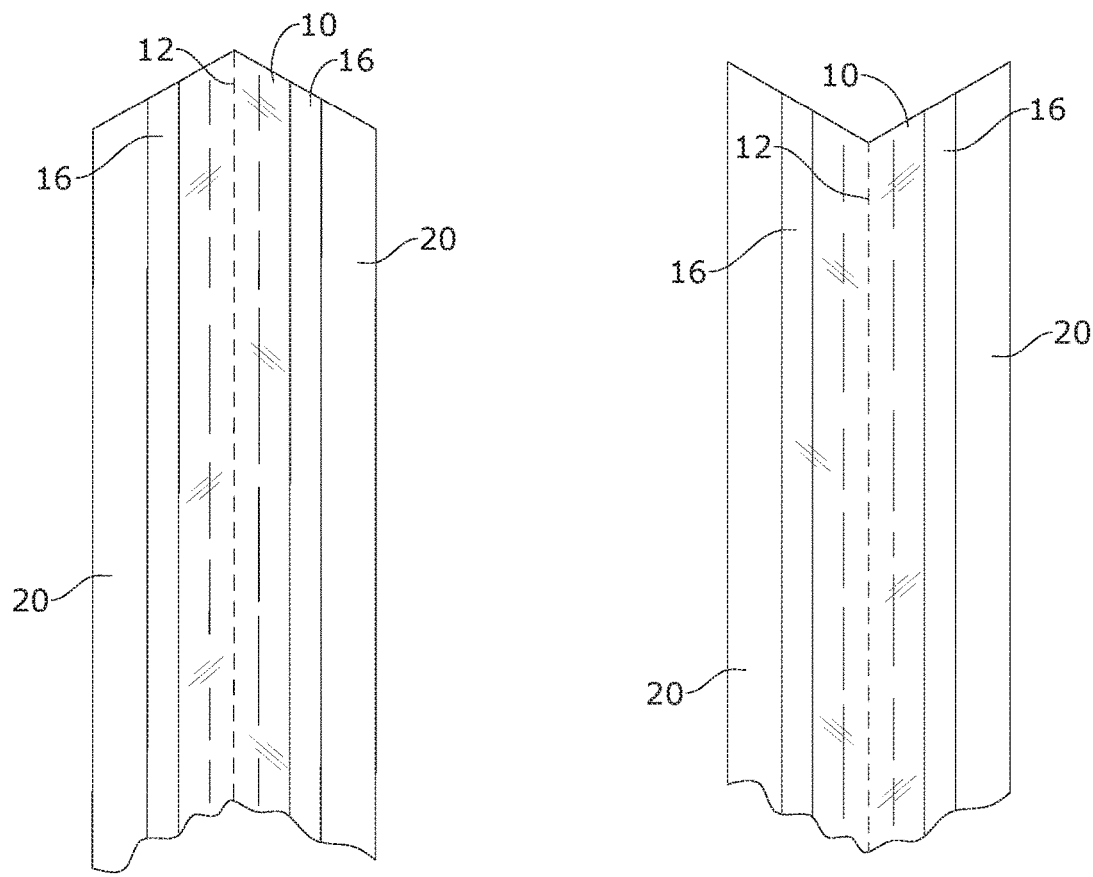

MULTILAYERED TAPE WITH REMOVABLE CARRIER LAYER

BACKGROUND OF THE INVENTION

The present invention relates to tape for use in home repair and improvement and, more particularly, to multilayered tape.

Uneven caulking of gaps and cracks reduces the quality of any type of finishing work. In order to avoid uneven lines, tape is usually applied to the surface to be caulked. However, the tape is hard to apply evenly and takes a lot of time.

As can be seen, there is a need for a quick, easy way to consistently produce even edges to caulking.

The present invention provides a multi-layered tape which may be applied to a gapped surface in any circumstances. The outer carrier layer of tape may be removed, with or without a middle layer of tape, and then caulk or filler may be applied. After removing the remaining layer(s) of tape, the caulk is left with a clean line. The tape may be applied much faster in a single roll and much more evenly. The tape may be cut into predetermined lengths prior to use on shorter or longer gaps.

SUMMARY OF THE INVENTION

In one aspect of the present invention, a multilayer tape is provided comprising an inner layer having a pair of parallel adhesive strips demarking an inner gap therebetween, said inner gap having a predetermined width; at least one middle layer, adhered to the inner layer, having a pair of parallel adhesive strips demarking a middle gap having a predetermined width narrower than the inner gap; and an outer carrier layer adhered to the at least one middle layer.

In another aspect of the present invention, a method of masking a surface for precise application of a substance is provided. The method comprises applying a multilayer tape system to a surface, said multilayer tape system having an inner layer having a pair of parallel adhesive strips demarking an inner gap therebetween, said inner gap having a predetermined width at least one middle layer, adhered to the inner layer, having a pair of parallel adhesive strips demarking a middle gap having a predetermined width narrower than the inner gap; and an outer carrier layer adhered to the at least one middle layer; and removing the outer carrier layer to expose a preselected gap width.

In another aspect of the present invention, an adhesive assembly is provided, comprising multiple layers of successively spaced-apart guide strips of material coated with adhesive and a light-transmitting carrier strip, wherein said successively spaced-apart guide strips are adhered to said light-transmitting carrier strip.

These and other features, aspects and advantages of the present invention will become better understood with reference to the following drawings, description and claims.

BRIEF DESCRIPTION OF THE DRAWINGS

FIG. 1 is a perspective view of an embodiment of the inventive multilayer tape, shown on a roll;

FIG. 2 is a perspective view of the multilayer tape of FIG. 1, shown applied to a surface;

FIG. 3 is a front exploded view of a length of the multilayer tape of FIG. 1;

FIG. 4 is a rear exploded view of a length of the multilayer tape of FIG. 1;

FIG. 5 is a perspective view of the multilayer tape of FIG. 1, illustrating removal of a layer;

FIG. 6 is a perspective view of the multilayer tape of FIG. 1, illustrating removal of two layers simultaneously;

FIG. 7 is a front view of the multilayer tape of FIG. 1;

FIG. 8 is a front view of the multilayer tape of FIG. 5 with a layer removed and with caulk partially applied;

FIG. 9 is a front view of the multilayer tape of FIG. 6 with two layers removed and with caulk partially applied;

FIG. 10 is a perspective view of the multilayer tape of FIG. 1, shown folded for an inside corner application; and FIG. 11 is a perspective view of the multilayer tape of FIG. 1, shown folded for an outside corner application.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a multilayer tape system combining multiple layers of parallel lines or strips of adhesive tape, each layer having a gap of predetermined width ranging from about ⅛ inch to about 2 inches, such as about ¼ inch to about ½ inch, with a carrier layer that extends across the layers of parallel lines of tape as well as the gap therebetween. Preferably, a layer of tape applied directly to a surface to be treated has a wider gap than any other layer of tape in the multilayered tape system. As such, each layer of tape removed leaves a wider portion of the surface exposed, eliminating the need to reposition strips of tape to demark a desired gap width. In certain embodiments, two layers of two parallel lines or adhesive strips of tape may be adhered to one line of carrier tape to form one line of multi-layered tape. In other embodiments three or four layers of parallel lines of tape may be adhered to one line of carrier tape. The gap between the pair of strips of tape applied directly to a surface (i.e., the inner layer) may be described as the inner gap and the gap between a pair of strips of tape in between the inner layer and the outer carrier layer (i.e., a middle layer) may be described as a middle gap. Preferably, the middle gap has a predetermined width narrower than the inner gap.

The multilayered tape system of the invention may be used to mask a surface for precise application of a substance such as caulk. The multi-layered tape may be applied to a surface with the outer carrier layer of tape extending over the gap formed between the layers of parallel lines of tape. Once the parallel strips of an inner layer of tape adhere to the surface, the clear outer carrier layer of tape may be removed, revealing the surface within the gap which may be easily treated with caulk, paint, pin-striping, silicone (such as for windows), mortar, or any other contraction-based or home improvement gap filling. A middle layer of tape may be removed with the outer carrier layer to expose a wider surface area for caulking or other treatment, depending upon the preselected gap width desired. The remaining layer(s) of tape may be removed, for example after the caulk dries, unveiling a clean line of caulk. The carrier layer generally has no adhesive across the region defined between the other layers of tape. Preferably, the adhesive layer adhering the carrier layer to the adjacent layer has weaker adhesion than the adhesive of any other layer, making it easier to remove without disturbing the other layer(s) of tape.

Preferably, the multilayer tape may be rolled. In some embodiments, the roll has a backing layer separating an inner layer of tape, rolled on top of a carrier layer underneath, from adhering to the carrier layer. The backing layer may be peeled off before application.

As used herein, a first layer of tape may also be called an outer carrier layer; a second layer of tape may be called a middle layer; and a third layer of tape may be called an inner layer. In some embodiments, the middle layer may have more than one layer of tape. The invention is not limited to the number of layers illustrated in the Figures.

As used herein, guide strips of material coated with adhesive refers to lines of tape.

Preferably, the outer carrier layer may have a transparent, translucent, or clear appearance, i.e., the carrier layer transmits light. In some embodiments, the carrier layer may also be provided with a longitudinal guide marking the longitudinal center line of the tape. The longitudinal guide allows the user to center the multilayered tape over a predetermined portion of a surface such as a wall.

In some cases, the multilayered tape may be applied to an inside corner, such as the surface between the top of a tub and adjacent tile. The tape may be applied such that one line of the inner layer of tape adheres to the tub and an opposing line of the inner layer of tape adheres to the tile. Similarly, the multilayered tape may be applied to an outside corner. In either case, the multilayer tape is applied at the intersection of two planar surfaces forming a corner such that a first strip is applied to a first planar surface and a second strip is applied to a second planar surface.

Referring to FIGS. 1-11, FIG. 1 illustrates an embodiment of the inventive multilayer tape in the form of a roll 100 comprising a first transparent layer 10 with a perforated center guide or fold line 12, two strips of a second layer of tape 16, and two strips of a third layer of tape 20. FIG. 2 illustrates application of the multilayer tape to a surface 30, centering the center guide 12 along a surface 32 to be caulked. FIG. 3 is an exploded view showing one surface of three layers of tape 10, 16, 20 and FIG. 4 is an exploded view showing adhesive 14, 18, 22 on the opposing surface of the three layers.

FIGS. 5-11 illustrate a method of using the inventive tape according to one embodiment. As shown in FIG. 5, the first transparent layer of tape 10 may be removed, exposing a narrow gap 24, while FIG. 6 illustrates the first layer and the second layer of tape being removed to expose a wide gap 26. FIG. 7 shows the multilayer tape as initially applied to a surface. FIG. 8 shows a bead of caulk 34 applied within the narrow gap 24 exposed after removal of the first transparent layer of tape 10, while FIG. 9 illustrates a bead of caulk 34 applied within the wide gap 26 exposed when the first two layers of tape 10, 16 are removed. FIGS. 10 and 11 illustrate the multilayer tape used for corner applications.

It should be understood, of course, that the foregoing relates to exemplary embodiments of the invention and that modifications may be made without departing from the spirit and scope of the invention as set forth in the following claims.

What is claimed is:

1. A multilayer tape comprising:
   a. an inner layer having a pair of parallel adhesive strips demarking an inner gap therebetween, said inner gap having a predetermined width;
   b. at least one middle layer, adhered to the inner layer, having a pair of parallel adhesive strips demarking a middle gap having a predetermined width narrower than the inner gap; and
   c. an outer carrier layer adhered to the at least one middle layer.

2. The multilayer tape of claim 1, wherein the multilayer tape is present as a roll.

3. The multilayer tape of claim 1, wherein the inner layer and the at least one middle layer has a predetermined gap ranging from about ⅛ inch to about 2 inches, and wherein the inner gap is wider than the middle gap.

4. The multilayer tape of claim 1, wherein the outer carrier layer is characterized by an appearance selected from the group consisting of transparent, translucent, and clear; and a longitudinal center of the outer carrier layer is marked by a guide.

5. The multilayer tape of claim 1, wherein the outer carrier layer is adhered to the at least one middle layer with an adhesive that is weaker than adhesive provided on a surface of at least one layer selected from the group consisting of a distal surface of the inner layer and a surface between the inner layer and the at least one middle layer.

6. A method of masking a surface for precise application of a substance, comprising:
   a. Applying a multilayer tape system to a surface, said multilayer tape system having:
      i. an inner layer having a pair of parallel adhesive strips demarking an inner gap therebetween, said inner gap having a predetermined width;
      ii. at least one middle layer, adhered to the inner layer, having a pair of parallel adhesive strips demarking a middle gap having a predetermined width narrower than the inner gap; and
      iii. an outer carrier layer adhered to the at least one middle layer; and
   b. removing the outer carrier layer to expose a preselected gap width.

7. The method of claim 6, wherein the method further comprises removing the at least one middle layer.

8. The method of claim 6, wherein the outer carrier layer is characterized by an appearance selected from the group consisting of transparent, translucent, and clear; a longitudinal center of the outer carrier layer is marked by a guide; and the multilayer tape system is applied such that the guide is centered over a predetermined portion of the surface.

9. The method of claim 6, wherein prior to applying the multilayer tape system, a predetermined length of the multilayer tape system is severed from a roll of the multilayer tape system.

10. The method of claim 6, wherein the surface to which the multilayer tape system is applied intersects two planar surfaces to form a corner, and wherein a first strip of the inner layer is applied to a first planar surface and a second strip of the inner layer is applied to a second planar surface.

* * * * *